June 27, 1939. G. T. DOWNEY 2,164,232
FUEL COCK ASSEMBLY
Filed June 28, 1938 2 Sheets-Sheet 2
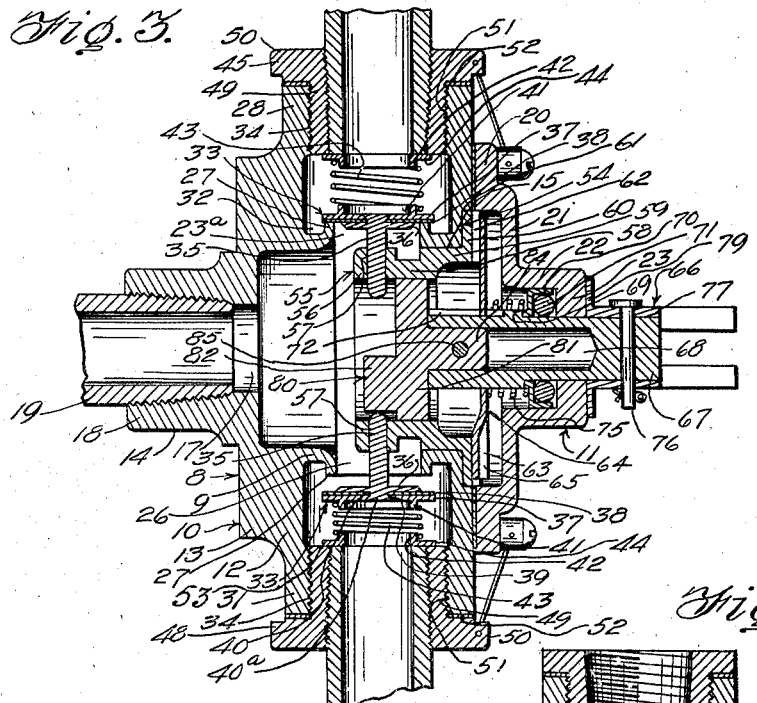
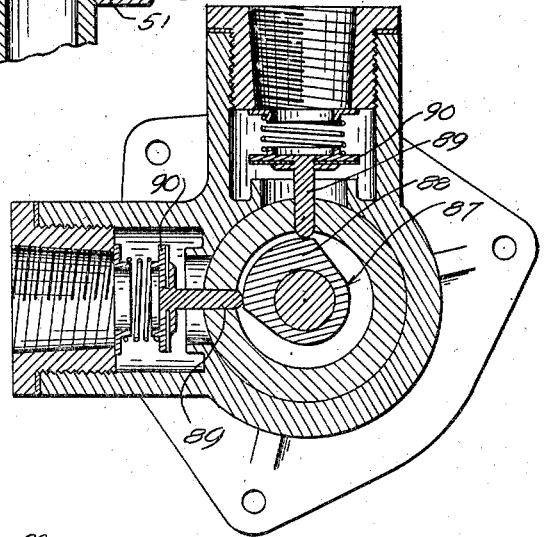
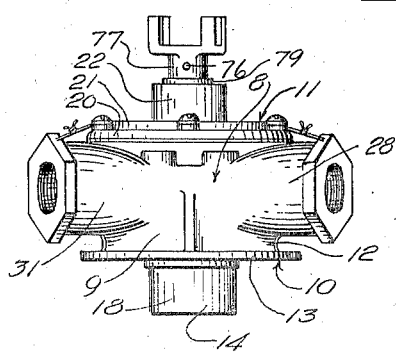
Inventor
GEORGE T. DOWNEY,
By Kimmel & Crowell,
Attorneys.

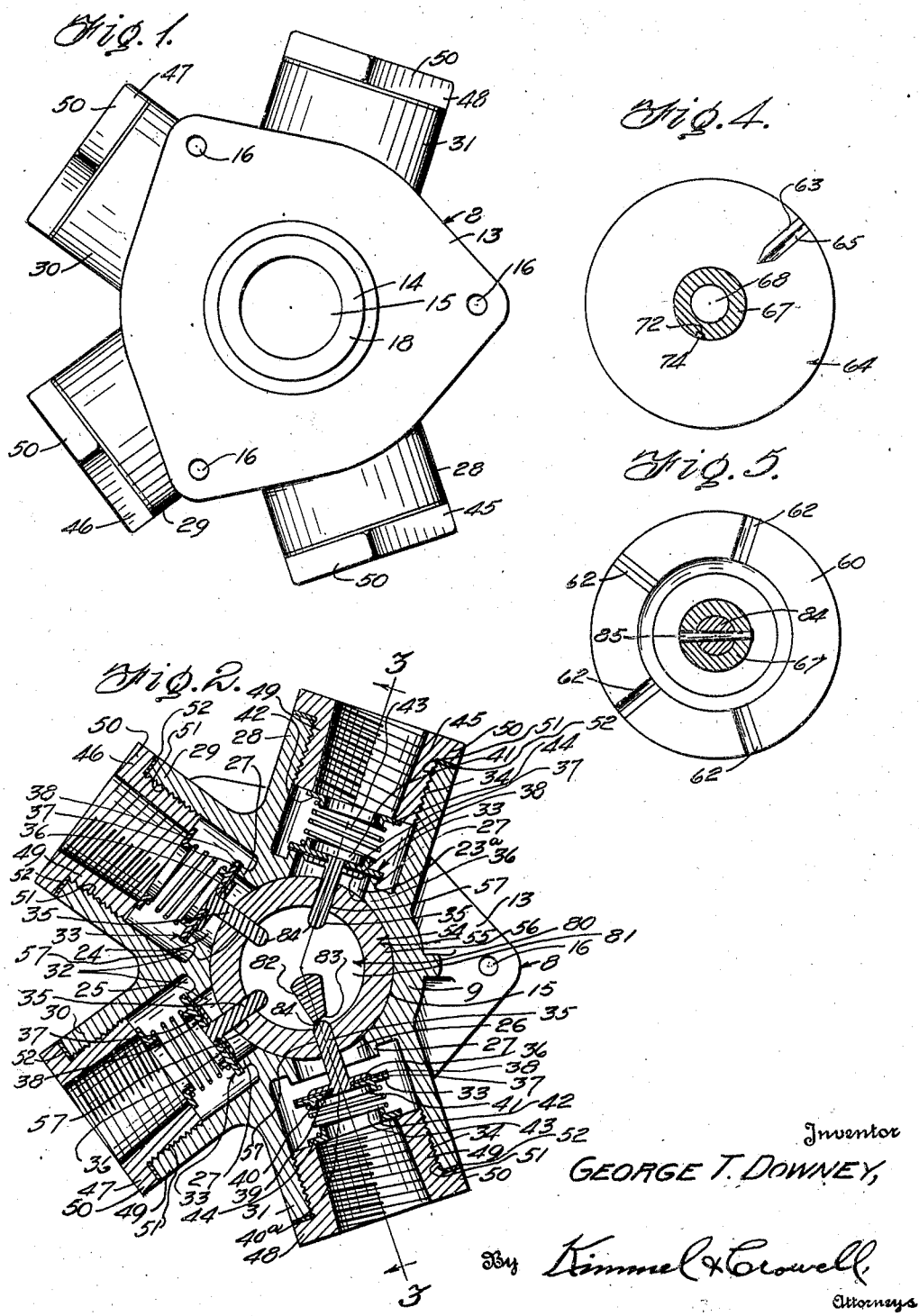

Patented June 27, 1939

2,164,232

UNITED STATES PATENT OFFICE 2,164,232

FUEL COCK ASSEMBLY

George T. Downey, Corry, Pa., assignor to Aero Supply Mfg. Co. Inc., Corry, Pa.

Application June 28, 1938, Serial No. 216,411

3 Claims. (Cl. 277—60)

This invention relates to a fuel cock assembly designed primarily for use in controlling the fuel supply for internal combustion motors employed on aeroplanes, but it is to be understood that the assembly, in accordance with this invention is for employment in any connection for which it may be found applicable.

The invention aims to provide, in a manner as hereinafter set forth, a fuel cock assembly common to a plurality of independent fuel sources.

The invention further aims to provide a fuel cock assembly common to a series of independent fuel sources, and capable of selectively establishing communication between the motors and one of said sources or for establishing communication simultaneously between two or more of said sources and the motors.

The invention further aims to provide, a fuel cock assembly so constructed, as to overcome the objection present in assemblies having as elements thereof ported rotatable corked valve plugs.

The invention further aims to provide, a fuel cock assembly having normally closed fuel supply controlling elements, each for an independent fuel source, means releasably engaging with said elements for shifting one or more of them to and for positively holding same in open position for fuel supply, and with said elements so constructed and arranged to provide for the automatic closing thereof when released from said means.

The invention further aims to provide a fuel cock assembly having normally closed fuel supply controlling elements, each for an independent fuel source, and each being so constructed as to positively prevent leakage when closed.

The invention further aims to provide, a fuel cock assembly including normally closed fuel supply controlling elements possessing more efficiency and durability than the corked seated supply controlling elements now generally employed.

The invention further aims to provide, a fuel cock assembly for a series of independent fuel sources and including fuel supply controlling elements and rotatable shifting means for the latter, and with said elements and means so constructed and arranged to provide at all times for the ready shifting of the elements through said means.

The invention further aims to provide a fuel cock assembly common to a series of independent fuel sources, and with each of the sources being controlled by an automatically seating poppet valve.

The invention further aims to provide, in a manner as hereinafter set forth, a fuel cock assembly which is comparatively simple in its construction and arrangement, strong, durable, compact, quickly installed with respect to a series of independent fuel sources, thoroughly efficient in its use, conveniently and expeditiously controlled, readily assembled and comparatively inexpensive to manufacture.

Embodying the foregoing aims and to others which may directly or indirectly hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a bottom plan of a fuel cock assembly in accordance with this invention, Figure 2 is a sectional plan of the structure shown in Figure 1, Figure 3 is a section on line 3—3, Figure 2, Figure 4 is a sectional detail illustrating the check plate, Figure 5 is a sectional detail illustrating the combined holder, guide and stop element, Figure 6 is a side elevation of the assembly, and Figure 7 is a section plan of a modified form.

With reference to Figures 1 to 6 of the drawings, the assembly includes a housing 8 formed of a cylindrical body part 9 permanently closed at its lower end by an integral bottom wall 10 and having its upper end closed by a removable top wall 11. The bottom wall 10 consists of an upper portion 12, an intermediate portion 13 and a lower portion 14 integrally connected together. The portion 12 is of annular form, is integral with the lower end of body part 9 and forms a downward continuation of fuel receiving chamber 15 provided by the said body part. The portion 13 extends laterally in opposite directions with respect to the portions 12, 14 and it is formed with spaced openings 16 for the passage of holdfast means for anchoring the assembly at the desired point. The portion 13 centrally thereof is provided with a fuel outlet 17 for the chamber 15 and which is of a diameter less than the inner diameter of the portion 12. The portion 14 is in the form of a sleeve 18 for connection to a fuel conducting pipe 19 leading to the motors, not shown with which the assembly is to be associated with.

The top wall 11 includes a lower portion 20 in the form of an annulus, an annular intermediate portion 21 of angle-shape cross section, and a cylindrical upper portion 22 having its upper end formed with an inwardly extending annular flange 23. The portions of the wall 10 are integrally connected together. The portion 20 is of greater diameter than portion 21 and the latter is of greater diameter than portion 22. The portion 21 is extended upwardly with respect to portion 20. The portion 22 is extended upwardly with respect to the portion 21. The axes of the said portions 20, 21, 22 align. The lower portion 20 of wall 11 is of greater diameter than the upper end of body part 9.

The assembly shown by Figures 1 to 6 is for use in connection with and is common to a plurality of independent fuel sources. The member of such sources may be as desired. As shown by way of example, the said assembly is so constructed as to be common to four independent sources of fuel, not shown. The assembly will be set up to include an independent valve of the poppet type for controlling the intake of fuel to the chamber 15 from each source. To provide for the assembly to be common to independent sources of fuel, it will include fuel supply line couplers corresponding in number to the number of fuel sources to be controlled, and with each coupler to be secured to and projecting from a tubular extension integral with the body part 9 of the housing 8. In the embodiment of the invention, as shown by Figures 1 to 6 four spaced radially disposed tubular extensions are shown and there is associated with each extension a valve controlled fuel inlet or intake for chamber 15. The extension, inlets and valves will be more specifically referred to.

The body part 9 is formed with the spaced fuel inlets 23ª, 24, 25, 26, as well as having its outer periphery provided with a set of annular flanges 27, each providing an outward continuation of the wall of a fuel inlet. Integral with the outer periphery of the body part are the tubular extensions referred to and which are indicated at 28, 29, 30, 31. The inner end of each extension encompasses in spaced relation a flange 27, to form in connection with the latter an annular groove 32. Each of said flanges provides a valve seat for a poppet valve 33. The inner end of one side of the extension 28 merges into the inner end of one side of the extension 29. The inner end of the other side of the extension 29 merges into the inner end of one side of the extension 30, and the inner end of the other side of the extension 30 merges into the inner end of one side of the extension 31. The outer portion of the inner face of each of said extensions is formed with threads 34.

The valves 33 are slidably mounted and of like construction. Each valve 33 consists of a stem 35, an annular flat flange 36 adjacent the outer end of stem 35 and a disc-like head formed of an outer section 37 and an inner section 38 constituting a seating facing formed of any suitable material possessing a characteristic to provide a fuel tight seating when the valve is closed. The stem 35 and head section 37 are of metallic material, preferably of a like metallic material, but of a material different from that of section 38. The sections of the valve head are of greater diameter than either of the flanges 27. The section 37 has an axially arranged flared opening 39. The section 38 is formed with an opening 40 of uniform diameter, but of a diameter corresponding to the diameter of opening 39 at the lower end of the latter. The flange 36 seats against the inner face or head section 38. The stem 35 passes through opening 40 and is upset, as at 40ª to snugly engage the wall of opening 39 whereby the stem and head are rigidly clamped together. The outer face of head section 37 is formed concentrically thereof and adjacent to its perimeter with an outwardly directed annular flange 41.

The valves 33 have associated therewith spring controlling means therefor of like form consisting of a flange collar 42 and a coiled spring 43 having one end encompassing the collar 42 and abutting the flange 44 of the latter. The other end of spring 43 abuts valve head section 37 and encompassing the flange 41 on such section. The spring controlling means for the valves are arranged in the tubular extension and associate with the inner ends of the fuel supply line couplers indicated at 45, 46, 47, 48. The couplers are of like form and each consists of a sleeve 49 provided at its outer end with an annular laterally extending flange 50. The inner diameter of the sleeve 49 gradually increases from its inner end to its outer end. The sleeve 49 from the flange 50 to the inner end thereof is of uniform outer diameter. The sleeves 49 are threaded on their outer peripheries as at 51 and are of less length than the tubular extensions. The couplers are positioned in the tubular extensions and have their flanges 50 oppose the outer end surfaces of the tubular extensions, and interposed between such flanges and the said extensions are sealing gaskets 52. The couplers have threaded engagement with the extensions and their inner ends 53 constitute stops for the flanged collars 42.

The assembly as shown by Figures 1 to 8 includes a combined holder, guide and stop element 54 which functions to prevent the valves 27 from shifting laterally with respect to their seats, for guiding the stems of the valves and for releasably holding a valve opening device in its active position. The said device is common to and for selective action on the valves. The element 54 consists of a vertically disposed annular body portion 55 formed of a lower inner part 56 provided with spaced guide openings 57 for the valve stems 35, in intermediate part 58 of an outer diameter less than the part 56 and an upper part 59 formed at its top with a laterally disposed annular flange 60. The element 54 is inserted into chamber 15 from the open top of body part 9. The lower end of element 54 is spaced upwardly from the lower end of chamber 15. The element 54 when inserted into chamber 15 has its flange 60 seat in a rabbet 61 formed in the upper end of body part 9, its upper part 59 bearing against that portion of the wall of chamber 15 bordering the rabbet 61 and its parts 56, 58 opposing in spaced relation the inlets 26. The part 56 of element 54 does not extend completely across the inlets 26. The openings 57 in part 56 align with the axes of the inlets 26. The flange 60 on part 59 of element 54 is formed with a series of spaced keepers 62 for selective coaction with a latching member 63 carried by an adjustable rotatable spring controlled check plate 64 for latching the latter in its adjusted position. The plate 64 is in the form of an axially apertured circular disc which has its outer marginal portion of its lower face opposing the flange 60. The keepers 62 are in the form of spaced radially disposed V-shaped grooves in the upper face of the flange 60.

The latching member 63 is provided by a depressed portion 65 formed in the upper face of the outer marginal part of the plate 64. The portion 65 corresponds in cross section contour to the shape of each of the keepers. The latching member is disposed on a diametric center and is of less length than the diameter of the plate 64. The member 63 at its outer end is flush with the outer edge of the plate 64.

The device for controlling the opening of the valves 27 to selectively establish communication between the chamber 15 and a fuel source is generally indicated at 66 and it not only includes the check plate 64, but further includes a vertically disposed rotatable shaft 67 formed lengthwise thereof with a socket 68 opening at its lower end. The shaft 67 extends through the wall 11 into the upper portion of chamber 15. The flange 23 of top wall forming part 22 provides a bearing for shaft 67 intermediate the ends of the latter, and such shaft intermediate its end is formed with an annular shoulder 69 on its outer periphery. Abutting shoulder 69 and extending upwardly therefrom is a combined shaft stop and bearing retainer 70. The latter is of angle-shape in cross section, is offset relative to shaft 67 and opposes in close spaced relation the lower face of flange 23. The retainer 70 coacts with the flange 23 for arresting the upward shift of shaft 67. Surrounding the shaft 67 is a bearing means 71, which is confined in position relative to shaft 67, by the coaction of retainer 70 and flange 23. The shaft 67, lengthwise of its outer periphery is formed with a groove 72 which extends from the shoulder to the lower end of the shaft. The wall of the axial opening 73 of the plate 66 is formed with a lug 74 positioned in the groove 72 whereby plate 66 is slidable relatively to shaft 67, but is bodily movable with the latter. Encompassing the shaft 67 and interposed between retainer 70 and plate 64 is a coiled spring 75 normally tending to maintain the latching member 63 against the upper face of flange 60. The shaft 67 projects upwardly from the flange 23 on the part 22 of wall 11 and has anchored on its projecting portion, by the holdfast means 76 a sleeve 77 terminating at its upper end into a yoke 78 extended from shaft 67 and adapted to receive any suitable instrument to provide for the rotation of the shaft. The lower end of sleeve 77 is formed with a lateral flange 79 which abuts the flange 23. The flanges 79, 23 coact to prevent the lowering of shaft 67.

The device 66 also includes a rotatable cam structure 80, for selectively opening a valve 27, and for releasably holding the valve in open position. The structure 80 is bodily carried with the shaft 67. The structure 80 comprises a circular disc 81 of a diameter to have its edge snugly engage the inner face of the portion 58 of body part 55 of element 54. The disc 81 is interposed between the portions 56, 59 of the body part 55 of element 54. The lower face of disc 81 has formed integral therewith a nose 82 disposed on a diametric center of the disc 81 and interposed between, as well as being spaced from the axis and edge of the disc 81. The nose 82 is encompassed by and spaced from the part 56 of element 54. The nose 82 gradually decreases in thickness from its inner to its outer end and has its outer end surface beveled, as at 83 for selectively coacting with the rounded inner ends 84 of the valve stems 35. Extending upwardly from the upper face of disc 81, axially of the latter is an arm 84, which extends into the socket 68 and is anchored to the shaft 67 by the holdfast means 85. The arm 84 is to extend into socket 68 to an extent to have the upper face of disc 81 to abut the lower end of shaft 67.

When selectively opening the valves 27, as well as releasing these latter from open position, the device 66 moves in an anti-clockwise direction.

It will be assumed that all of the valves 27 are closed, and the operator desires to cut in a fuel source, now by slowly turning the shaft 67 in an anti-clockwise direction, the check plate 64 will be carried therewith until the latching member 63 snaps into a keeper 62 whereby the movement of shaft 67 will be stopped, thereby indicating to the operator that the nose 82 has been positioned to engage and shift a valve stem outwardly to the desired extent to open that valve associated with such stem whereby the fuel source has been cut in to chamber 15. The latching member will be releasably retained in the keeper by the spring 75 and the nose 82 held against the valve stem by the spring 43. The foregoing operation is intermittently carried out until all of the fluid sources have been successively cut in to chamber 15.

With respect to the modified form of fuel cock assembly 86 shown in Figure 7, it is of the same construction as the form illustrated by Figures 1 to 6, with the exception that it is provided with a cam structure 87 for simultaneously opening a pair of fuel sources to the fuel receiving chamber 15. The nose 88 of the cam structure 87 is of a different form with respect to the nose 82 of cam structure 80. The nose 88 is substantially of quadrant shape and of a width to simultaneously act on a pair of valve stems 89 to open a pair of valves 90 and to simultaneously hold the pair of valves 90 in open position. Otherwise than that as stated the modified form 86 will be of the same construction as that of the other form illustrated.

What I claim is:

1. In a fuel cock assembly, a housing forming a fuel receiving chamber having a plurality of spaced fuel intakes, each for a fuel source, said housing having a permanently open outlet for said chamber and spaced annular flanges forming outward continuations of the walls of said inlets, said flanges constituting valve seats, spaced poppet valves for coaction with said seats for closing the inlets, each valve including a head coacting with a flange and a stem extending inwardly through an inlet, tubular extensions on said housing and encompassing said valves, a spring controlling means for each valve including a flanged collar and a coiled spring extending inwardly from the collar and seating against a valve head, each of said heads being formed with an annular flange encompassed by the inner end of the spring, combined fuel supply line couplers retaining means for said spring controlling means extending into and connected to said extensions and having their inner ends abutting said collars, an annular stationary combined holder, guide and stop element, arranged in said chamber, spaced from said outlet and having spaced guide openings for the passage of the valve stems thereinto, a rotatable structure arranged within said element for engaging with said valve stems to open the valves, said element and said structure having coacting parts for latching said structure selectively during the rotation of the latter, said housing and element providing a bearing for said structure, the latter being extended from the housing and provided with means for receiving an instrument to rotate it.

2. In a fuel cock assembly, a housing forming a fuel receiving chamber having an end wall, a side wall and open at its other end, said side wall being formed with a plurality of spaced fuel inlets and valve seats on its outer surface bordering said inlets, said end wall being formed with a permanently open fuel outlet, spaced shiftable spring controlled poppet valves having their heads disposed exteriorly of said inlets and normally engaging said seats, said valves having their stems extending inwardly through said inlets into said chamber, said housing being formed with tubular extensions encompassing said valves, said seats and the valve springs in spaced relation, tubular combined fuel supply line couplers and valve spring retaining means extending into, secured to and of less length than said extensions, the inner ends of said means bearing on the valve springs, an annular stationary combined holder, guide and stop element extending into said chamber from the open end of the latter, spaced from said outlet and inlets, formed with a flange at its outer end seated in the body of the housing and provided with spaced guide openings for the passage of said stems there into, a hollow inner end and apertured outer end closure for the open end of said chamber, a rotatable structure extending through said closure into said element and having a part operating in said element for shifting the stems to open the valves, and said flange and structure having coacting parts for latching said structure selectively on the rotation of the latter.

3. In a fuel cock assembly, a housing forming a fuel receiving chamber having an end wall, a side wall and open at its other end, said side wall being formed with a plurality of spaced fuel inlets and valve seats on its outer surface bordering said inlets, said end wall being formed with a permanently open fuel outlet, spaced shiftable spring-controlled poppet valves having their heads disposed exteriorly of said inlets and normally engaging said seats, said valves having their stems extending inwardly through said inlets into said chamber, said housing being formed with tubular extensions encompassing said valves, said seats and the valve springs in spaced relation, tubular combined fuel supply line couplers and valve spring retaining means extending into, secured to and of less length than said extensions, the inner ends of said means bearing on the valve springs, an annular stationary combined holder, guide and stop element extending into said chamber from the open end of the latter, spaced from said outlet and inlets, formed with a flange at its outer end seated in the body of the housing and provided with spaced guide openings for the passage of said stems thereinto, a hollow inner end and apertured outer end closure for the open end of said chamber, a rotatable structure extending through said closure into said element and having a part operating in said element for shifting the stems to open the valves, and said flange and structure having coacting parts for latching said structure selectively on the rotation of the latter, said closure being provided therein with a confined bearing for said structure, and the coacting part of said structure being arranged within the closure forwardly of said bearing.

GEORGE T. DOWNEY.